(12) United States Patent
Konan et al.

(10) Patent No.: US 12,530,273 B2
(45) Date of Patent: *Jan. 20, 2026

(54) INTERNAL RESOURCE MONITORING IN MEMORY DEVICES

(71) Applicant: Micron Technology, Inc., Boise, ID (US)

(72) Inventors: Andrei Konan, Meridian, ID (US); Byron D. Harris, Mead, CO (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/769,959

(22) Filed: Jul. 11, 2024

(65) Prior Publication Data

US 2024/0362136 A1 Oct. 31, 2024

Related U.S. Application Data

(63) Continuation of application No. 17/464,023, filed on Sep. 1, 2021, now Pat. No. 12,066,914.

(51) Int. Cl.
*G06F 11/30* (2006.01)
*G06F 9/4401* (2018.01)
*G06F 11/32* (2006.01)

(52) U.S. Cl.
CPC ........ *G06F 11/3037* (2013.01); *G06F 9/4403* (2013.01); *G06F 11/3024* (2013.01); *G06F 11/3075* (2013.01); *G06F 11/328* (2013.01)

(58) Field of Classification Search
CPC ............. G06F 11/3037; G06F 11/3024; G06F 11/3075; G06F 11/328
See application file for complete search history.

(56) References Cited

U.S. PATENT DOCUMENTS

| | | |
|---|---|---|
| 2009/0265424 A1 | 10/2009 | Kimoto et al. |
| 2014/0215129 A1 | 7/2014 | Kuzmin et al. |
| 2014/0344824 A1 | 11/2014 | Brock et al. |
| 2015/0127993 A1 | 5/2015 | Sankar et al. |
| 2017/0075767 A1 | 3/2017 | Madhavarapu et al. |
| 2017/0365324 A1 | 12/2017 | Bains et al. |
| 2018/0278714 A1 | 9/2018 | Das |
| 2019/0042414 A1 | 2/2019 | Juenemann et al. |
| 2020/0104068 A1 | 4/2020 | Brandt et al. |
| 2020/0210371 A1 | 7/2020 | Groves |

OTHER PUBLICATIONS

International Search Report and Written Opinion for Application No. PCT/US2022/042264, mailed on Dec. 21, 2022, 9 pages.

*Primary Examiner* — Nicholas A. Paperno
(74) *Attorney, Agent, or Firm* — Lowenstein Sandler LLP

(57) ABSTRACT

Systems and methods are disclosed including for enabling a memory sub-system to perform firmware-based monitoring of system state information without adding latency to the memory sub-system. In an example, a first central processing unit (CPU) of a memory subsystem controller sends, to a second CPU of a memory subsystem controller, an address range. In response to a timer expiring and the second CPU being in an idle state, the second CPU retrieves a log file stored at the address range and sends the log file to a host system.

20 Claims, 4 Drawing Sheets

INTERNAL RESOURCE MONITORING IN MEMORY DEVICES

RELATED APPLICATION

This application a continuation of U.S. patent application Ser. No. 17/464,023, filed Sep. 1, 2021, the entire contents of which is hereby incorporated by reference herein.

TECHNICAL FIELD

Embodiments of the disclosure generally relate to memory sub-systems, and more specifically, relate to monitoring internal resources in memory devices.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
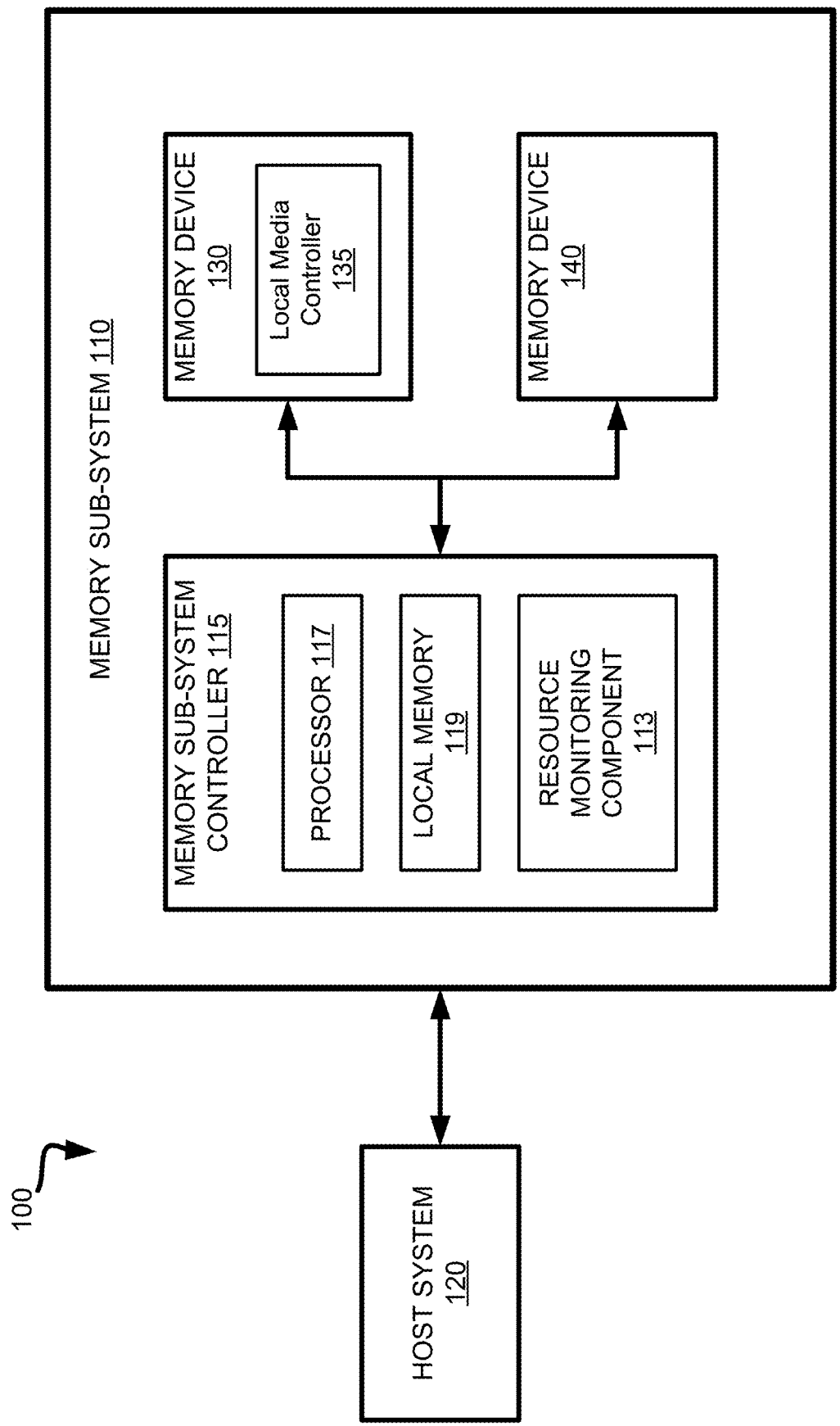
FIG. 1 illustrates an example computing system that includes a memory sub-system in accordance with some embodiments of the present disclosure.

Aspects of the present disclosure are directed to monitoring internal resources in memory sub-systems. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

Memory access operations can be performed by the memory sub-system. The memory access operations can be host-initiated operations or memory sub-system controller initialed. For example, the host system can initiate a memory access operation (e.g., write operation, read operation, erase operation, etc.) on a memory sub-system. The host system can send memory access commands (e.g., write command, read command) to the memory sub-system, such as to store data on a memory device at the memory sub-system and to read data from the memory device on the memory sub-system. The data to be read or written, as specified by a host request, is hereinafter referred to as "host data". A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., ECC codeword, parity code), data version (e.g. used to distinguish age of data written), valid bitmap (which LBAs or logical transfer units contain valid data), etc. Memory access operations initiated by the memory sub-system controller can relate to maintenance operations, such as garbage collection, wear leveling, bad block management, block refresh operations, etc.

While processing the memory access commands, the memory sub-system can experience quality of service issues, such a latency caused by defects in the memory sub-system software, firmware, and/or hardware. Debugging can involve finding and reducing the number of defects. Various debugging techniques can be used to detect anomalies, assess their impact, and schedule hardware changes, firmware upgrades, or full updates to a system. The goals of debugging include identifying and rectifying defects in the system (e.g., logical or synchronization problems in the firmware, or a design error in the hardware) by analyzing the system state information, which can include various data related to the operation of the memory sub-system.

One example of system state information can include event data generated in the memory sub-system. An event, as used herein, generally refers to a detectable change of state caused by an action performed by hardware, software, and/or firmware in the memory sub-system. Examples of events include a memory sub-system controller sending and/or receiving data or accessing a memory location of a memory device, a warning related to some reliability statistic (e.g., raw bit error rate (RBER), wear leveling, etc.) of a memory device, an error experienced by the memory sub-system controller in reading data from or writing data to a memory device, garbage collection, encoding and/or decoding, retrieving memory access commands from a queue(s) (e.g., a scheduling queue, a submission queue, etc.), data reconstruction, direct memory access (DMA) operations, media scans, or any other event relating to memory access operations. Data relating to the event can include time data (e.g., a timestamp of when execution of the event began, a timestamp of when execution of the event concluded, timer data relating to the duration of executing the event, etc.), metric data (e.g., data relating to metrics used by the memory sub-system), error handling data (e.g., types of error handling operations performed), queueing data, etc.

Point-in-time debug information can be important to analyzing events being reported from customer use and/or during the qualification of the memory sub-system (e.g., an SSD). Debug information can include a snapshot of the state of the memory sub-system taken during the time that the reported issue occurred (e.g., an error or a failure). In particular, a snapshot can save the state of memory device registers, the memory, and other critical data area. Analyzing the debug information can help determine the root cause of the issue. In order to create a snapshot, each central processing unit (CPU) core saves its hardware registers and/or other important regions of memory.

In some systems, the memory sub-system can be configured to generate multiple snapshots (periodic snapshots, snapshots during a specified time range, etc.) to sample event data from the memory sub-system and store the captured data in a data structure (e.g., a log file). The memory sub-system can then send the log to the host system for analysis. For example, the host system can analyze the log data (such as timestamp data) to determine whether and when latency issues occurred.

However, sampling via multiple snapshots can cause significant latency issues in the memory sub-system. For example, sampling can consume thousands of instruction cycles for capturing and extracting the debug information. Furthermore, sending, to the host system, the log file that contains data relating to thousands of snapshots can consume additional instruction cycles, which further increases the experienced latency.

In some implementations, debugging operations or other analyses of the memory sub-system can be performed on a separate computing device, such as a host system, communicably coupled to the memory sub-system through a communication channel. The communication channel can be implemented, for example, by a universal asynchronous receiver-transmitter (UART) bus, an inter-integrated circuit (I2C) bus, a system management bus (SMBus), a Nexus bus, a peripheral component interconnect express (PCIe) bus, or some other type of communication mechanism. Depending on the type of communication pipe used, the available bandwidth can vary, and only a fixed amount of system state information can be transferred over the communication pipe to the host system in a given amount of time. Thus, certain communication pipes can be considered to have limited bandwidth since they may not be able to adequately transfer all of the event entries generated in the memory sub-system. For example, a communication pipe having limited bandwidth may have a bandwidth that is below a certain threshold, or that is below a bandwidth level required to transfer a certain amount of data (e.g., the total size of all available event entries in the memory sub-system) within a fixed amount of time. When conventional systems attempt to transfer all of the event entries to the host system for debugging, certain event entries are dropped or delayed, potentially including critical or important event entries. In addition, other traffic in the communication pipe, such as host commands or memory sub-system data, can be delayed or dropped in favor of the system state information being transferred. Accordingly, a system capable of capturing debug information without adversely affecting the performance of the memory sub-system is desirable, Aspects of the present disclosure address the above-noted and other deficiencies by enabling the memory sub-system to perform firmware-based monitoring of system state information without adding latency to the memory sub-system. The memory sub-system controller can include multiple CPUs which can be employed to perform different tasks. For example, the memory sub-system can include a set of frontend CPUs employed to fetch and decode instructions from memory, and a set of backend CPUs employed to execute the instructions. By way of example, frontend CPUs can include an administrative CPU employed to perform administrative tasks (e.g., memory partitioning, boot up operations, etc.), an input/output (I/O) write CPU employed to execute write access commands received from the host system, a I/O read CPU employed to execute read access commands received from the host system, and a flash transition layer (FTL) CPU employed to execute maintenance tasks (e.g., erasing operations, wear leveling operations, random access operations, etc.).

The memory sub-system controller can employ one of the frontend CPUs as a monitoring CPU capable of executing a data-gathering task to retrieve system state information from the other CPU (hereafter "monitored CPUs"). In one embodiment, the administrative CPU can be employed as the monitoring CPU using a data-gathering component. In particular, the administrative CPU generally remains idle while the write, read and FTL CPUs perform tasks. Accordingly, since the administrative CPU is idle, configuring the administrative CPU to retrieve system state information may not assign resources reserved for other tasks, thus will not generate significant latency issues in the memory sub-system during debugging. In some embodiments, the local memory (e.g., a CPU cache, CPU register file, etc.) of each CPU can store a task data structure that includes tasks to be processed by each corresponding CPU. In addition, the local memory of each CPU can also store a logging data structure that records system state information, such as, for example, system resource data (e.g., active write location, block recovery data, etc.), statistic data (e.g., read counters, write counters, wear leveling counters, garbage collection operation counters, etc.), instruction cycle data (e.g., timestamp data, duration data, etc.), etc. Each logging data structure can be stored at a specific address range of the local memory of a corresponding CPU. The address range used by each logging data structure can change during each boot up of the memory sub-system. Accordingly, in some embodiments, during boot up to the memory sub-system, each CPU can send to the monitoring CPU the physical address or logical address of their respective logging data structures.

The monitoring CPU can retrieve the system state information from the logging data structures using an interface capable of passing control, address, data, and other signals between the each of the frontend CPUs, each of the backend CPUs, and each memory device of the memory sub-system. The memory interface can map the external requests received from the host system to an internal memory map. The mapping information can be contained in internal registers. The monitoring CPU can retrieve the system state information at a predetermined frequency (e.g., responsive to a periodic expiration of a timer). The data-gathering task can retrieve the system state information from each logging data structure using the address of each logging data structure. In some embodiments, the monitoring CPU can retrieve and store the system state information as a log file in its internal local memory. The monitoring CPU (or the monitored CPUs) can format the log file using any desired format (e.g., an executable and linkable format (ELF), JavaScript Object Notation (JSON), Extensible Markup Language (XML), YAML, etc.). The monitoring CPU can then export the log file to the host system via a vendor specific debugging interface or any other interface (e.g., a peripheral component interconnect express (PCIe) bus, a system management bus (SMBus), an inter-integrated circuit (I2C) bus, etc.). The host system can then perform debugging operations to determine, for example, whether and when latency issues occurred. The monitoring CPU can export the log file to the host system either directly or via intermediate device.

Advantages of the present disclosure include, but are not limited to, providing an improved system for capturing system state information without interfering with other tasks being performed by the memory sub-system controller. The system state information provides targeted point-in-time debug information, which can be used to determine the root cause of the issue that led to quality of service issues (e.g., latency issues) or system failure. In addition, the system state information provides debug information relating to queueing data, error handling operations, etc. Aspects of the present disclosure provide reduced latency in capturing the debug information by enabling the hardware and/or software to capture system state information using an idle CPU, thus improving the performance of the memory device.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

The memory device 130 can include one or more decks. A deck can be defined as an array of memory cells with electronically conductive access lines. Multiple decks can be stacked within memory device 130. Each deck can have inherently different levels of endurance (e.g., an indication of approximately how many times the deck can be written to, read, and/or erased before physical wear causes the deck to fail).

Although non-volatile memory components such as 3D cross-point array of non-volatile memory cells and NAND type flash memory (e.g. 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands from the host system 120 and can convert the commands into instructions or appropriate commands to achieve the desired access to the memory devices 130. The memory sub-system controller 115 can be responsible for other operations such as media management operations, garbage collection operations, error detection and error-correcting code (ECC) operations, encryption operations, caching operations, and address translations between a logical address (e.g., logical block address (LBA), namespace) and a physical address (e.g., physical management unit address, physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which includes a raw memory device 130 having control logic (e.g., local controller 132) on the die and a controller (e.g., memory sub-system controller 115) for media management within the same memory device package. An example of a managed memory device is a managed NAND (MNAND) device.

The memory sub-system 110 includes a resource-monitoring component 113 that can be used to provide configuration settings to and employ a monitoring CPU to capture system state information from one or more monitored CPUs of the memory sub-system 110, one or more registers of the memory sub-system 110, and/or from the memory devices 130, 140. In some embodiments, the memory sub-system controller 115 includes at least a portion of the resource-monitoring component 113. In some embodiments, the resource-monitoring component 113 is part of the host system 110, an application, or an operating system. In other embodiments, local media controller 135 includes at least a portion of resource-monitoring component 113 and is configured to perform the functionality described herein.

Figure 2:
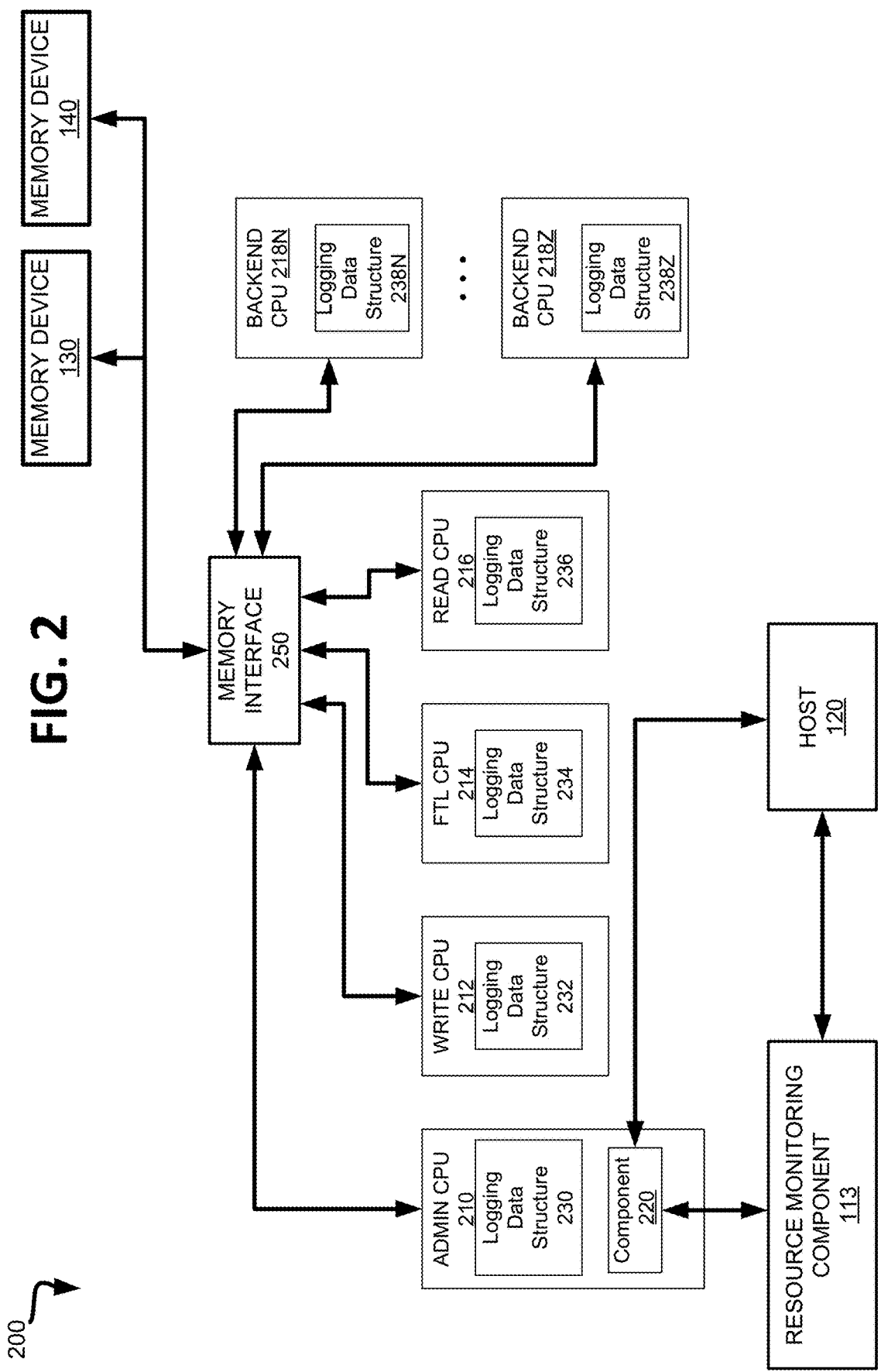
FIG. 2 is a block diagram illustrating a computing system for monitoring and exporting system state information, in accordance with some embodiments of the present disclosure.

FIG. 2 is a block diagram illustrating computing system 200 for monitoring and exporting system state information, in accordance with some embodiments of the present disclosure. Computing system 200 is a more detailed view of computing system 100. Computing system 200 can include one or more frontend CPUs (e.g., administrative CPU 210, I/O write CPU 212, flash transition layer CPU 214, and I/O read CPU 216), one or more backend CPUs (e.g., backend CPU 218N-218Z), memory interface 250, resource monitoring component 113, host 120, and memory device 130, 140. Frontend CPUs can be employed to fetch and decode instructions from memory (or a cache). Backend CPUs (or execution engines) can be employed to execute the instructions. Each CPU can be assigned specific tasks and functions. Administrative CPU 210 can perform administrative tasks, such as, for example, memory partitioning, boot up operations, etc. As will be discussed in detail below, administrative CPU 210 can include data gathering component 220 which can be employed to monitor, collect, and export system state information. Write CPU 212 can execute write access commands received from host system 120 or memory sub-system controller 115. FTL CPU 214 can execute maintenance tasks, such as, for example, erasing operations, wear leveling operations, random access operations, etc. Read CPU 216 can execute read access commands received from host system 120 or memory sub-system controller 115. To perform the respective tasks, each the local memory (e.g., a CPU cache, a CPU register file, local memory 119 etc.) of each CPU 210, 212, 214, 216 can include respective tasks data structure (not shown) employed to process the tasks of each corresponding CPU 210, 212, 214, 216.

In some embodiments, the local memory of each CPU 210, 212, 214, 216 can further store a respective logging data structure 230, 232, 234, 236 can store system resource data. System resource data can include any data structure or memory sub-system controller resource that the firmware of the memory sub-system is operating. More specifically, any firmware data structure residing in any memory (memory device 130, 140, local memory 119) is a resource that can be monitored. System resource data can be monitored over time. System resource data can be local to a CPU (e.g., active write location, block recovery data, etc.) or used by multiple CPUs, such as block stripe information. In some embodiments, system resource data can include metric data (e.g., data relating to metrics used by the memory subsystem), error handling data (e.g., types of error handling operations performed), queueing data, etc.

In some embodiments, logging data structure 230, 232, 234, 236 can store statistic data. Statistics data can include custom counters that are incremented in certain scenarios. For example, a write counter can indicate the number of write access commands that were processed by write CPU 212 (e.g., the number of write access commands executed during a specific period of time, a total amount of write commands executed, etc.), a read counter can indicate the number of read access commands that were processed by read CPU 216 (e.g., the number of read access commands executed during a specific time period, a total amount of read commands executed, etc.), a counter associated with wear leveling, a counter associated with garbage collection operations, etc.

In some embodiments, logging data structure 230, 232, 234, 236 can store instruction cycle data. Monitoring instruction cycles allows resource-monitoring component 113 to capture code time execution for certain firmware processes. For example, resource-monitoring component 113 can capture the average or maximum execution time to perform FTL tasks, write access commands, read access commands, etc. Some instruction cycle data can be local to single CPU, or cross-CPUs. For example, a read access command can be initiated in the read CPU 216, and be completed in the write CPU 212. The execution time data can include a timestamp of when execution of the task began, a timestamp of when execution of the task concluded, timer data relating to the duration of executing the task, etc.

In some embodiments, each logging data structure 230-236 can be stored in the memory local memory of the CPU (e.g., CPU 210-216, respectively). The local memory can be a CPU cache, CPU register file, etc. In other embodiments, the logging data structure 230-236 can be stored in memory device 130, 140. Each logging data structure 230-236 can be stored at a specific address range. In some embodiments, the address range associated with each data structure 230-236 can change during each boot up of the memory sub-system 110. Accordingly, during boot up, each CPU (210-216 and 218N-218Z) can send, to the resource-monitoring component 113 or data-gathering component 220, the physical address or logical address of each respective logging data structure 230-236, 238N-238Z.

Memory interface 250 can be any type of physical or logical interface capable of passing control, address, data, and other signals between the each of the frontend CPUs, each of the backend CPUs, and each of the memory devices 130, 140. In some embodiments, memory interface 250 can include a processor interface capable of performing data accesses. Memory interface 250 can map the external requests received from the host system 120 to an internal memory map. The mapping function can be configurable and the mapping information is contained in internal registers. During each retrieval period by the monitoring CPU, the monitoring CPU can translate local resource addresses into memory interface 250 addresses, read the resource data, and log it into its data structure.

Administrative CPU 210 can include data-gathering component 220. Resource monitoring component 113 can employ administrative CPU 210 as a monitoring CPU and execute a data-gathering task to retrieve system state information (e.g., system resource data, statistic data, instruction cycle data, etc.) from write CPU 212, FTL CPU 214, read CPU 216, backend CPU 218N-218Z, memory device 130, 140, and/or resource monitoring component 113. It should be noted that administrative CPU 210 is employed as a monitoring CPU by way of example, and that other CPUs can be employed to perform the tasks and functions of the monitoring CPU.

The system state information can include event data generated by each monitored CPU. Data gathering component 220 can execute the data-gathering task at a predetermined frequency (e.g., predefined interval value) (hereafter "collection period"). For example, data gathering component 220 can execute the data-gathering task responsive to a periodic expiration of a timer. The data gathering task can retrieve the system state information from each logging data structure 232-236, 238N-238Z (and/or from memory device 130, 140) using the addresses of each data structure received by the administrative CPU 210 during boot up of the memory sub-system component 110. In some embodiments, the data-gathering component 220 can retrieve and store the system state information as a log file in data structure 230. In some embodiments, each monitored CPU can generate and store the log file in its respective data structure, data-gathering component 220 can retrieve and store each log file in data structure 230. The log file can be formatted using any desired format (e.g., an executable and linkable format (ELF), JavaScript Object Notation (JSON), Extensible Markup Language (XML), YAML, etc.).

In an example, for each task executed by monitored CPU, the monitored CPU can collect and store, in its logging data structure, the system resource data (e.g., timestamps, statistics, etc.) related to the task. Upon completion of each collection period, the monitoring CPU (e.g., CPU 210) can retrieve, from the monitored CPU's logging data structure, and store, as a log file in logging data structure 230, the system resource data. The monitoring CPU can then export the log file to host 120, and clear logging data structure 230 of the log file for the next collection period.

In some embodiments, resource-monitoring component 113 can assign, to a task, a task identification used to track system resource data associated with the task across multiple CPUs. For example, a task can begin in one monitored CPU and be completed in another monitored CPU (e.g., a read command can begin in read CPU 216 and be completed in write CPU 212). The resource-monitoring component 113 can use the task identification to track system resource data resource data associated with the task as it is processed by multiple CPUs, then combine the system resource data in the log file.

In some embodiments, the data-gathering task can be set as a low priority task. Any administrative related task to be executed administrative CPU 210 can be set to a higher priority than the data-gathering task, thus enabling administrative CPU 210 to prioritize performing administrative tasks over the data-gathering task.

In some embodiments, the data-gathering component 220 can include monitored data configuration settings used to specify which system state information is to be retrieved from each of the logging data structure 232-236, 238N-238Z and/or from memory device 130, 140. The resource-monitoring component 113 can configure the monitored data configuration settings. For example, resource-monitoring component 113 can determine which system state information is retrieved from each data structure logging 232-236, 238N-238Z and/or from memory device 130, 140 during the execution of the data-gathering task.

In some embodiments, some system state information stored and maintained by resource monitoring component 113. For example, the system state information stored and maintained by resource monitoring component 113 can include counter of read and write access commands issued, a counter of read and write access commands completed, data relating to execution duration (e.g., timestamps), etc. To retrieve this system state information, data-gathering component 220 can query the resource-monitoring component 113 to request the corresponding system state information. In some embodiments, data gathering component can retrieve data or request data from the registers of the memory sub-system 110. For example, data gathering component 220 can request a snapshot of the state of each CPU of the memory sub-system 110.

Data-gathering component 220 can send (e.g., export) the log file(s) containing the retrieved system state information, via an interface, to the host system 120 for analysis (e.g., to perform debugging operations, to determine whether and when latency issues occurred, etc.). In some embodiments, the interface can include a vendor specific debugging interface, a universal asynchronous receiver-transmitter (UART) bus, a peripheral component interconnect express (PCIe) bus, a system management bus (SMBus), an inter-integrated circuit (I2C) bus, or any other electrical bus coupling host system 120 to memory sub-system 110. Each bus can be controlled by a respective driver (e.g., a PCIe/NVMe driver, a SMBus driver, etc.). The drivers can provide programming interfaces to control and manage the corresponding ports of the host system 120 and memory sub-system 110. Data-gathering component 220 (or resource monitoring component 113) can access the hardware functions of the bus ports to send and receive data via the respective driver.

In some embodiments, data-gathering component 220 can export the log file, via an interface, to an external device. The external device can be coupled memory sub-system 110 via one type of interface (e.g., a vendor specific debugging interface) and to host system 120 via another interface (e.g., a universal serial bus (USB)). The external device can be used to relatively quickly retrieve the system state data from the memory sub-system 110 using include a debugging interface, then send the system state data to host 120 using an interface unassociated with communications between host system 120 and memory sub-system 110.

In some embodiments, the log file can be exported in similar or the same time intervals as the data-gathering component 220 executes the data-gathering tasks. For example, the data-gathering component 220 can retrieve the log file(s), store them in a cache in data structure 230, export the log file(s), and then execute the data-gathering task again (or export the log file(s) while executing the next instance of the data-gathering task. In other embodiments, the data-gathering component 220 can store log files retrieved from multiple executed data-gathering tasks, and export the log files as a batch file.

Figure 3:
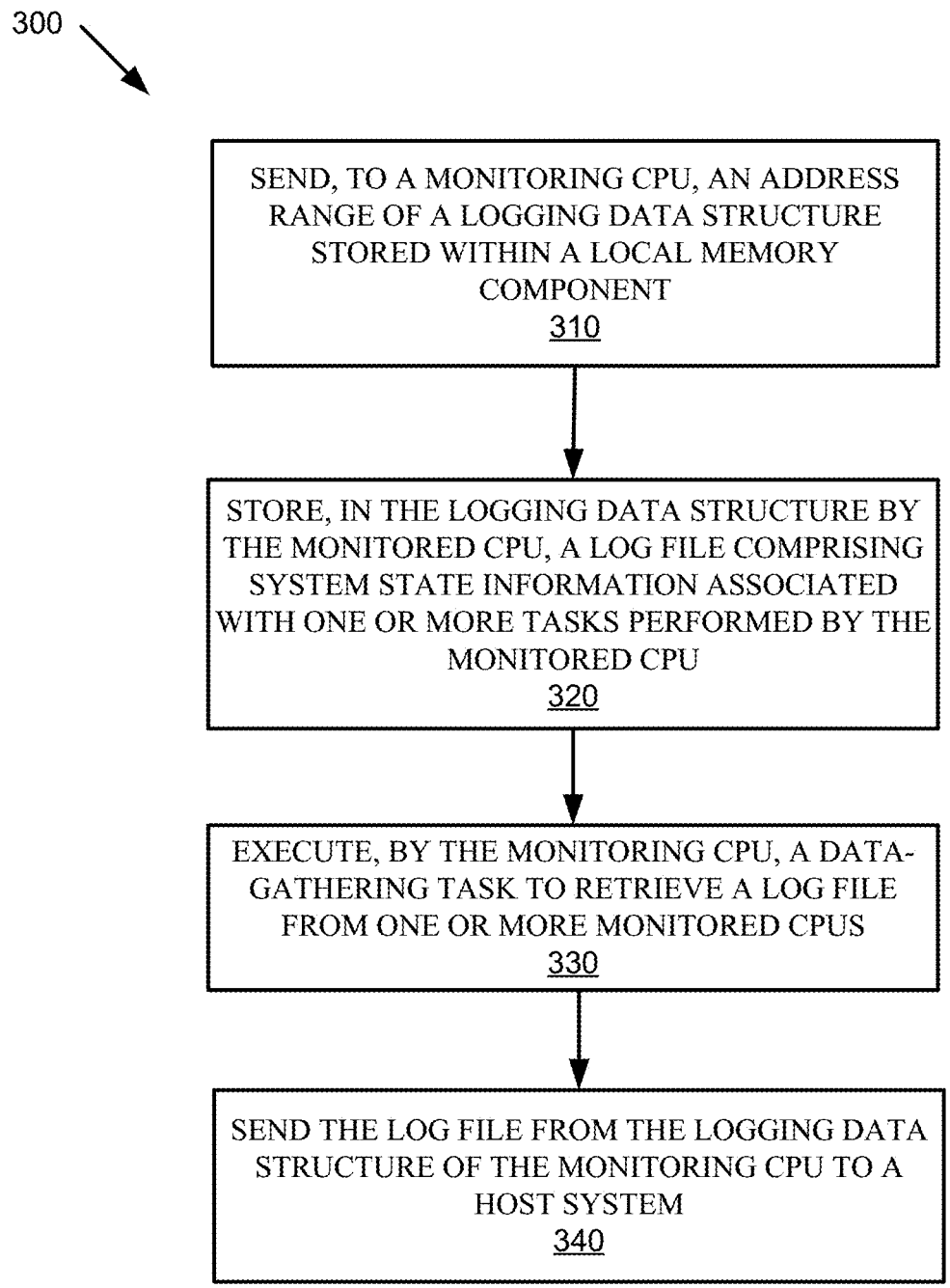
FIG. 3 is a flow diagram of an example method illustrating processes performed for monitoring system state information in the memory device, in accordance with some embodiments of the present disclosure.

FIG. 3 is a flow diagram of an example method 300 illustrating processes performed for monitoring system state information in the memory device, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed resource-monitoring component 113 of FIG. 1 and/or data-gathering component 220 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic sends, to a monitoring CPU, an address range of a logging data structure stored within a local memory component. For example, each monitored CPU can send, to the monitoring CPU, the physical address or logical address of their respective logging data structures. In some embodiments, operation 310 is performed during boot up to the memory sub-system.

At operation 320, the processing logic stores, in the logging data structure by the monitored CPU, a log file comprising system state information associated with one or more tasks performed by the monitored CPU. The system state information can include events performed by the monitored CPU. In some embodiments, the system state information can include system resource data, statistic data, and/or instruction cycle data.

At operation 330, the processing logic executes, by the monitoring CPU, a data-gathering task to retrieve a log file from one or more monitored CPUs. In some embodiments, the log file can be retrieved from a data structure stored in a local memory component of the monitored CPU. The processing logic can retrieve the log file using a memory interface capable of facilitating communication between one or more CPUs of a memory sub-system. The processing logic can store the log file in the logging data structure of the monitoring CPU. The processing logic can execute the data gathering task at a predetermined frequency (e.g., periodically at a predefined interval value, upon periodic expiration of a timer, etc.). In some embodiments, the processing logic is executed by a monitoring CPU. For example, the monitoring CPU can include administrative CPU 210. In some embodiments, the memory sub-system controller can identify a set of the system state information to be retrieved during execution of the data-gathering task. In some embodiments, the data-gathering task can be a low priority task.

At block 340, the processing logic sends the log file from the logging data structure of the monitoring CPU to a host system. In some embodiments, the host system can perform an analysis on the data stored in the log file (e.g., perform debugging operations, determine whether and when latency issues occurred, etc.). In some embodiments, the processing logic can send the log file to the host system via a vendor specific debugging interface. In some embodiments, the processing logic can first sent the log file to an external or intermediary device, which can then send the log file to the host system.

Figure 4:
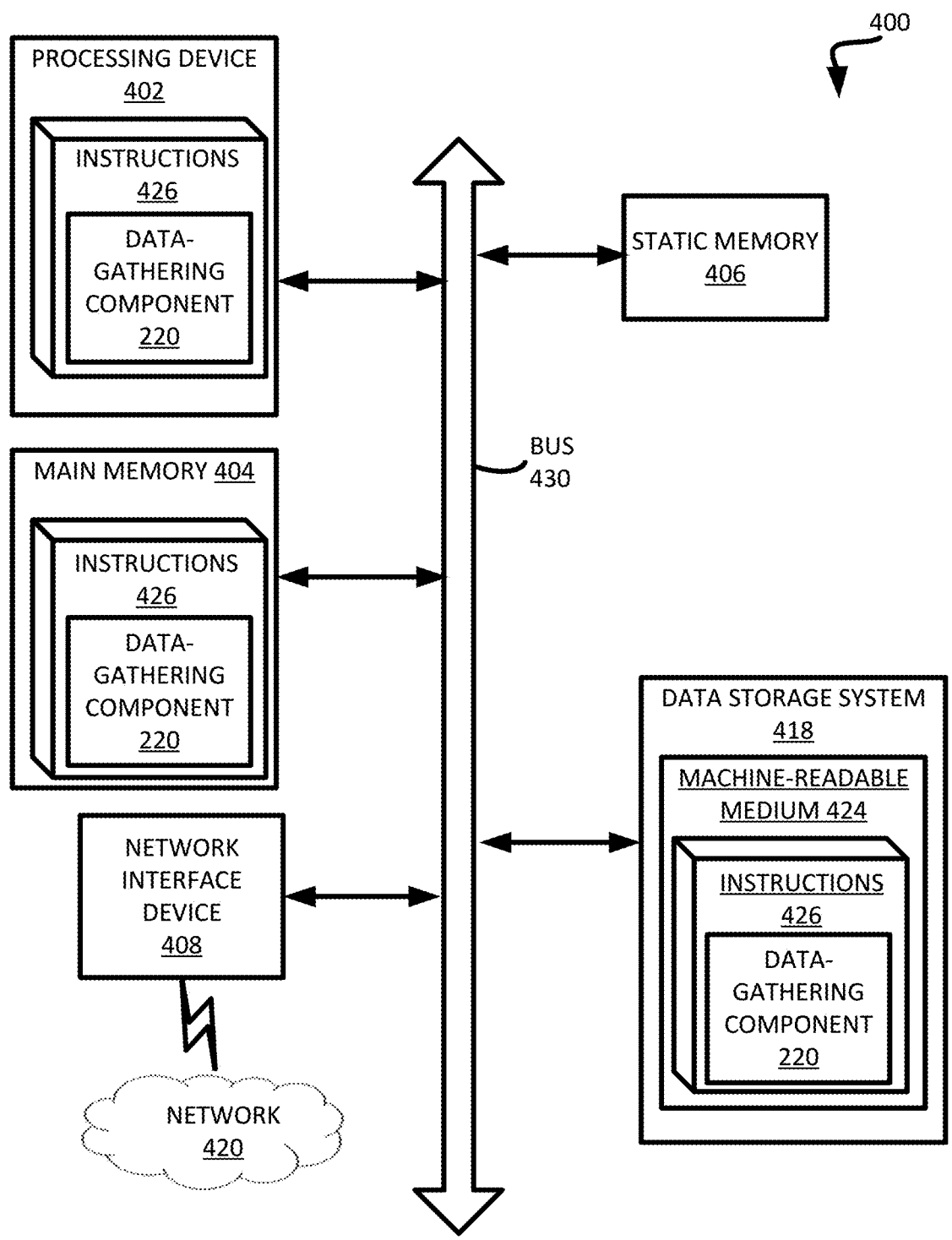
FIG. 4 is a block diagram of an example computer system in which embodiments of the present disclosure can operate.

FIG. 4 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes or utilizes a memory sub-system (e.g., the memory sub-system 110 of FIG. 1) or can be used to perform the operations of a controller (e.g., to execute an operating system to perform operations corresponding to resource-monitoring component 113 (not shown) of FIG. 1 and/or data-gathering component 220 of FIG. 2). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage system 418, which communicate with each other via a bus 430. Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is employed to execute instructions 426 for performing the operations and steps discussed herein. The computer system 400 can further include a network interface device 408 to communicate over the network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory sub-system 110 of FIG. 1.

In one embodiment, the instructions 426 include instructions to implement functionality corresponding to resource-monitoring component 113 (not shown) of FIG. 1 and/or data-gathering component 220 of FIG. 2. While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
sending, to a first central processing unit (CPU) of a memory subsystem controller, by a second CPU of the memory subsystem controller, an address range;
responsive to detecting an expiration of a timer and determining the first CPU is in an idle state, retrieving, by the first CPU, a log file stored at the address range; and
sending, by the first CPU, the log file to a host system.

2. The method of claim 1, further comprising:
retrieving the log file periodically at a predefined interval value.

3. The method of claim 1, wherein the log file is retrieved using a memory interface facilitating communication between the first CPU and the second CPU.

4. The method of claim 3, further comprising:
retrieving, by the first CPU, system state information from at least one memory device connected to the memory interface.

5. The method of claim 1, wherein retrieving the log file is a low priority task.

6. The method of claim 1, wherein the address range is sent during boot-up of a memory sub-system.

7. The method of claim 1, further comprising:
exporting the log file to an intermediary device.

8. A system comprising a first processing device operatively coupled to a second processing device, the first processing device configured to perform operations comprising:
receiving, from the second processing device, an address range;
responsive to detecting an expiration of a timer and determining the first processing device is in an idle state, retrieving, by the first processing device, a log file stored at the address range; and
sending the log file to a host system.

9. The system of claim 8, wherein the operations further comprise:
retrieving the log file periodically at a predefined interval value.

10. The system of claim 8, wherein the log file is retrieved using a memory interface facilitating communication between the first processing device and the second processing device.

11. The system of claim 10, wherein the operations further comprise:
retrieving system state information from at least one memory device connected to the memory interface.

12. The system of claim 8, wherein retrieving the log file is a low priority task.

13. The system of claim 8, wherein the address range is received during boot-up of a memory sub-system.

14. The system of claim 8, wherein the operations further comprise:
exporting the log file to an intermediary device.

15. A non-transitory computer-readable storage medium comprising instructions that, when executed by a first processing device operatively coupled to a memory device, performs operations comprising:
receiving, from a second processing device, an address range;
responsive to detecting an expiration of a timer and determining the first processing device is in an idle state, retrieving, by the first processing device, a log file stored at the address range; and
sending the log file to a host system.

16. The non-transitory computer-readable storage medium of claim 15, wherein the operations further comprise:
retrieving the log file periodically at a predefined interval value.

17. The non-transitory computer-readable storage medium of claim 15, wherein the log file is retrieved using a memory interface facilitating communication between the first processing device and the second processing device.

18. The non-transitory computer-readable storage medium of claim 15, wherein retrieving the log file is a low priority task.

19. The non-transitory computer-readable storage medium of claim 15, wherein the address range is received during boot-up of a memory sub-system.

20. The non-transitory computer-readable storage medium of claim 15, wherein the operations further comprise:
exporting the log file to an intermediary device.

* * * * *